March 23, 1965  H. C. ZEISLOFT  3,174,281
AFTERBURNER FUEL CONTROL
Original Filed Oct. 19, 1959  3 Sheets-Sheet 1

INVENTOR.
Harry C. Zeisloft
BY
Paul Fitzpatrick
ATTORNEY

INVENTOR.
Harry C. Zeisloft
BY
Paul Fitzpatrick
ATTORNEY

United States Patent Office 3,174,281
Patented Mar. 23, 1965

3,174,281
AFTERBURNER FUEL CONTROL
Harry C. Zeisloft, Flint, Mich., assignor to General Motors Corporation, Detroit, Mich., a corporation of Delaware
Continuation of application Ser. No. 847,407, Oct. 19, 1959. This application Dec. 14, 1962, Ser. No. 246,651
8 Claims. (Cl. 60—35.6)

This application is a continuation of my application Serial No. 847,407, filed October 19, 1959.

My invention relates to fuel controls for afterburners such as are employed in turbojet engines. Afterburners to burn fuel in and thereby heat the gases exhausting from the turbine have long been employed in turbojet engines. Various mechanisms to control the fuel to such afterburners have been proposed and used. My invention is directed to the provision of a control for this purpose which is better suited to the requirements of modern jet engines than those previously known, and which is simple and reliable.

Some automatic control of the supply of fuel to an afterburner is a practical necessity. When afterburning is in effect, the control should supply sufficient fuel to insure manitenance of combustion and should limit the fuel below a value which would overheat the engine exhaust structure. It should provide for manual variation within these ultimate limits of the amount of fuel supplied to the afterburner to provide for variation in the effective thrust of the engine. It should modulate or correct afterburner flow in accordance with the operation of the engine so that constant attention is not required. It should also operate the afterburner in such a manner as not to affect adversely the operation of the turbojet engine ahead of the afterburner.

My afterburner control includes automatic means for controlling the amount of fuel delivered from a pump to the afterburner and means for distributing this fuel to one or more manifolds, depending upon the level of fuel supply with relation to the gas flow in the afterburner. The amount of fuel supplied is determined primarily by a control settable by the aircraft pilot and means responsive to the ratio of afterburner fuel to main fuel, that is, fuel supplied to the combustion chambers of the engine which supply the turbine. The pilot's control actuates means for initiating and shutting down flow of fuel and means for varying the selected ratio of afterburner fuel to main fuel. The ratio control means also responds to the speed of the turbine and to temperature of air entering the engine so as to correct or trim fuel flow in accordance with these parameters which provide an indication of the relation of main fuel to engine air flow and of the requirements or tolerances of the afterburner for fuel. The control preferably also includes means responsive to engine inlet temperature which provides a limiting override on afterburner fuel, and means responsive to the turbine pressure ratio to limit afterburner fuel to prevent development of excessive back pressure which unfavorably affects turbine operation. In connection with this last item, for a given area of the engine exhaust nozzle, increase in fuel supplied to the afterburner will increase the pressure in the exhaust pipe, which acts to reduce the turbine pressure ratio.

The nature of the invention will be apparent from the succeeding detailed description of the preferred embodiment thereof and the accompanying schematic drawings thereof.

*General description of engine fuel system*

Figure 1:
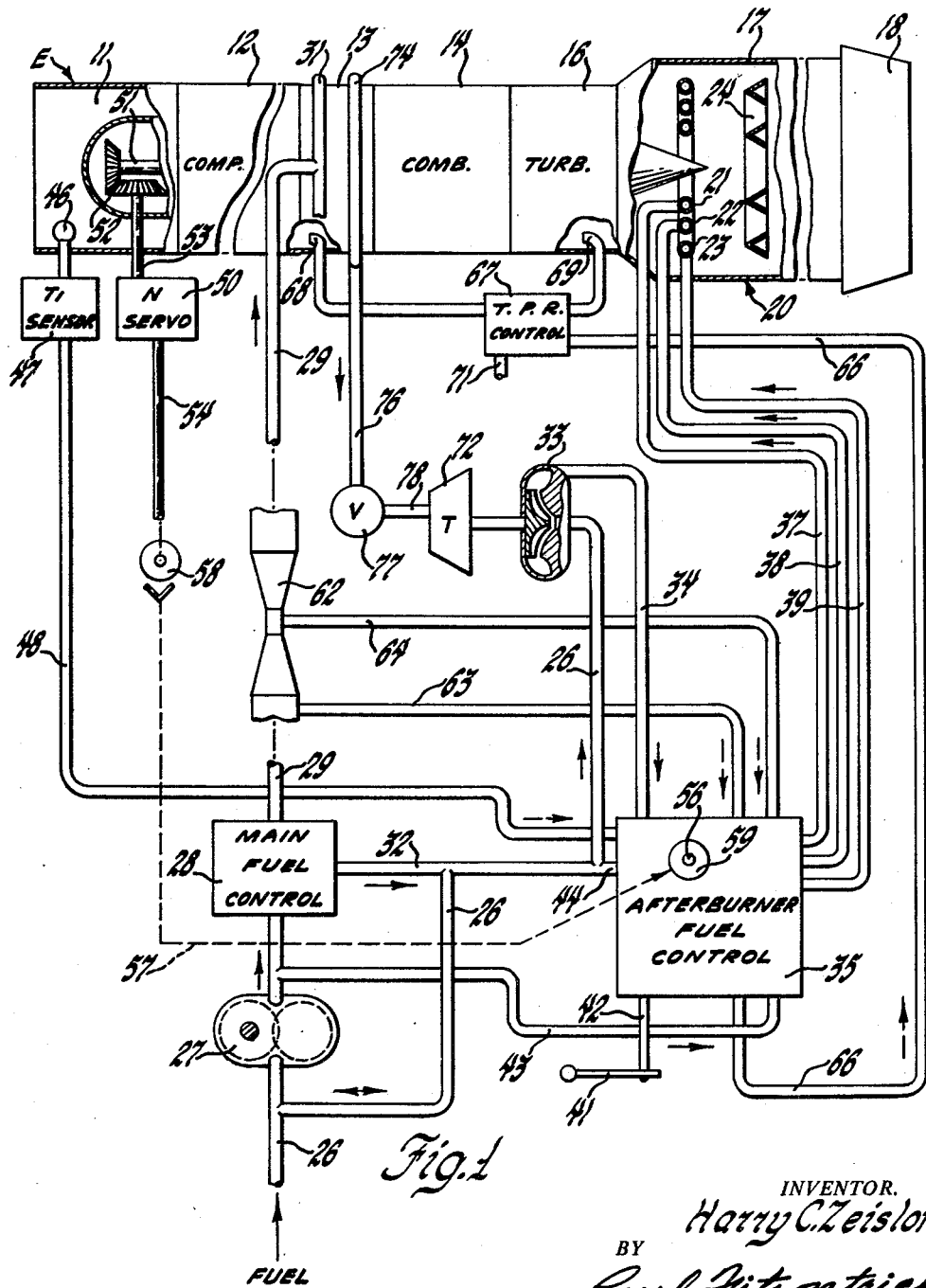
FIGURE 1 is a schematic illustration of a turbojet engine and a control system therefor.

Referring first to FIGURE 1, there is illustrated a turbojet engine E which may be of the usual type including an air inlet section 11, a compressor 12, a compressor outlet section or diffuser 13, a combustion section 14, a turbine 16, an exhaust duct 17, and a variable area exhaust nozzle 18. An afterburner 20 mounted in the exhaust duct comprises three concentric fuel spray manifolds 21, 22, and 23 and a suitable flameholder assembly 24.

Fuel is supplied to the main combustion apparatus 14 of the engine from a suitable aircraft source through line 26, pump 27, which may be driven by the engine, main fuel control 28, main fuel line 29, and a manifold 31 which supplies fuel nozzles (not shown) of the combustion apparatus. The main fuel control may be of a type which returns excessive pumped fuel through a line 32 to the fuel supply line. Fuel supply line 26 also communicates with the inlet of an afterburner fuel pump 33, shown as a centrifugal pump, which delivers fuel through line 34 to the afterburner fuel control 35. Fuel control 35 supplies fuel to the manifolds 21, 22, and 23 of the afterburner through fuel lines 37, 38, and 39, respectively.

The settable pilot's power control lever 41 is coupled to the fuel control 35 through appropriate means such as a shaft 42. Fuel under pressure to operate servomechanisms in the afterburner control is supplied from main fuel pump 27 through a line 43. Used servo fuel is returned to the inlet line 26 through an outlet 44 from control 35.

The afterburner control 35 is coupled to various mechanisms responsive to the operation of the engine E to control the afterburner fuel. Engine inlet air temperature is measured by a temperature bulb 46 coupled to an inlet temperature sensor or T1 sensor 47 which provides a pressure output which is a measure of inlet temperature. This T1 indicating pressure is supplied to the afterburner control through a pressure line 48. The details of the T1 sensor are immaterial. While this device is desirable, it is not necessary, since the afterburner control could respond directly to a pressure generated by bulb 46.

An engine speed sense is supplied to the afterburner fuel control by a speed servo or N servo 50 driven by the turbine of the engine through shaft 51, gearing 52, and shaft 53. The speed servo provides an output in the form of rotation of a shaft 54, the angular displacement of the shaft representing engine r.p.m. The nature of the speed servo is immaterial, but it may be of the type described in U.S. Patent 2,824,426. The speed output shaft 54 is mechanically coupled to a speed input shaft 56 of the fuel control by any suitable means 57 represented in FIGURE 1 by the broken arrow, which may be a belt and pulley type of transmission including a wheel 58 on shaft 54, a wheel 59 on shaft 56, and a suitable non-slip cable or belt 61 (FIGURE 3) coupling the two.

An input representing the fuel flow through line 29 to the main combustion apparatus is provided by a Venturi meter (or orifice meter) 62 in line 29. The pressures ahead of the meter and in the throat thereof are supplied to the afterburner control 35 through lines 63 and 64, respectively.

A control line 66 runs from afterburner control 35 to a turbine pressure ratio control 67 which responds to the pressure ratio across the turbine 16. The turbine pressure ratio control receives pressure inputs from a probe 68 located ahead of the turbine, as in the diffuser 13, and a second probe 69 located at the exhaust end of the turbine. The pressure ratio control device, which may be of any suitable known type, responds to the ratio of the pressures from the probes 68 and 69 and, when this ratio decreases below a desired value, bleeds servo fuel from the line 66 into a drain line 71, which returns the servo fuel to the pump inlet line 26.

The afterburner fuel pump 33 may be driven in any desired manner, but preferably is coupled to a turbine 72 energized by air bled from the engine E. An air bleed manifold 74 of the engine is coupled through pipe 76, shutoff valve 77, and line 78 to the turbine.

The foregoing description of FIGURE 1 is provided to explain the preferred environment of the fuel control and general nature of the control devices which coact with it. No detailed description of such matters is necessary, as they are known to those skilled in the art. Means for co-ordinating the settable control 41 of the afterburner with the usual pilot's operating control for the main fuel control, means for varying the area of nozzle 18 and co-ordination thereof with the afterburner fuel control, and means for igniting the afterburner, which also may be coordinated with the supply of fuel to the afterburner, are not described since this invention is independent of such matters, which may follow usual or any suitable practice in the art.

The afterburner fuel control

Figure 2:
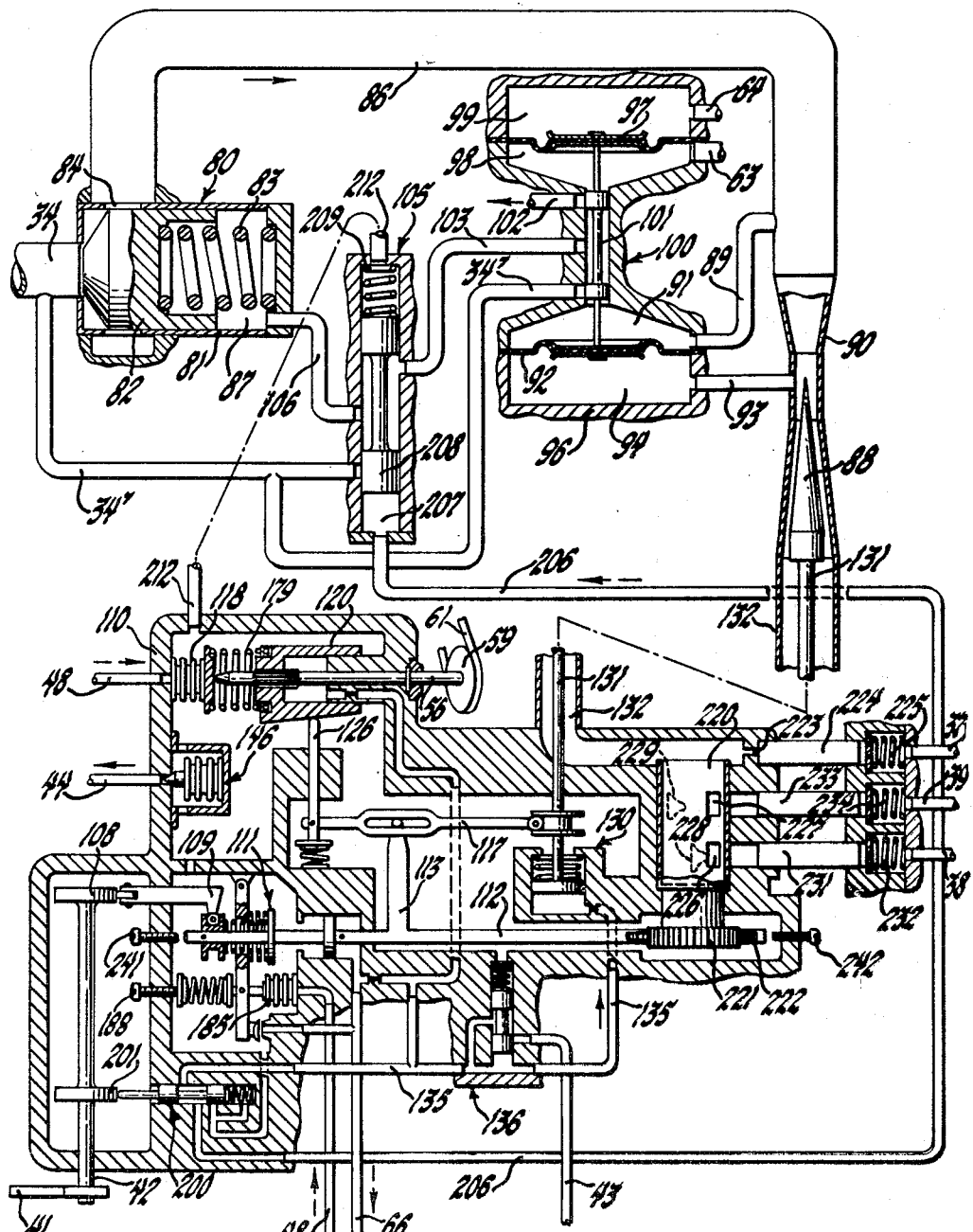
FIGURE 2 is a schematic diagram of the afterburner fuel control.
Figure 3:
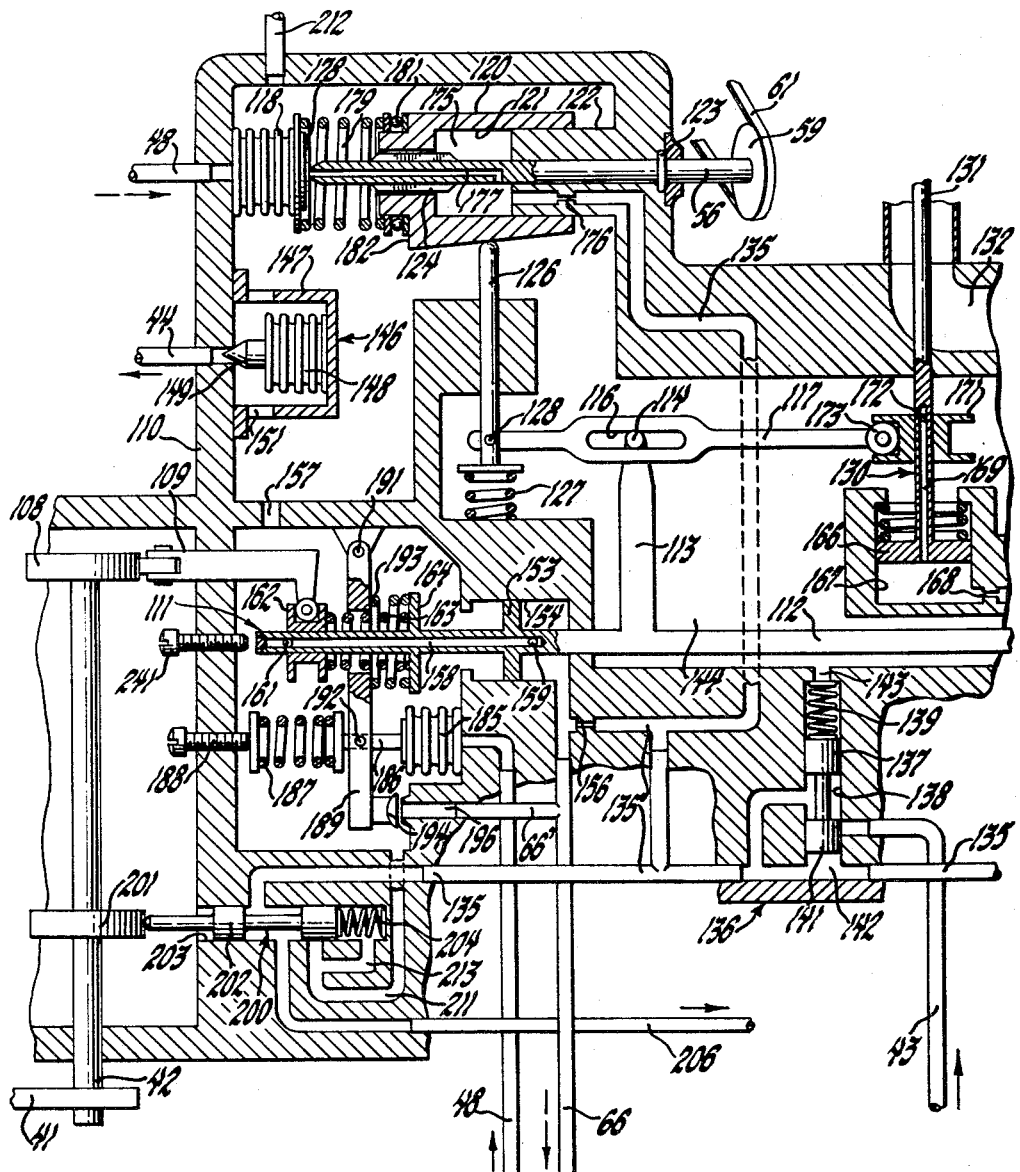
FIGURE 3 is an enlarged view of a portion of FIGURE 2, illustrating particularly the mechanization of the input parameters, computation devices, and output signals.

We may now refer to FIGURES 2 and 3 for a description of the afterburner fuel control mechanism indicated as 35 on FIGURE 1.

Afterburner fuel supplied by the pump 33 through line 34 is throttled or controlled by a main throttling valve 80 comprising a cylinder 81 within which a plunger 82 is biased to close line 34 by a compression spring 83. When the valve opens, fuel flows from line 34 past the head of plunger 82 and through ports 84 into a fuel line 86. The piston 82 is biased to open by the pressure in line 34 and biased to close by spring 83 and by a control pressure in chamber 87 behind the plunger which is determined by means to be described.

Line 86 is connected to a Venturi meter 90 which is of the usual type with the addition of a movable needle or valve 88 which is reciprocable axially of the Venturi meter to vary the throat area and thereby vary the relation between the pressure difference output signal of the Venturi meter and the flow through the meter. Movement of needle 88 is effected by a ratio control mechanism to be described. The means by which the fuel flowing through meter 90 is distributed to the fuel manifolds 21 to 23 of the afterburner will also be described.

The pressure in line 86 ahead of the Venturi is communicated through line 89 to a chamber 91 above a flexible diaphragm 92. The pressure in the throat of the Venturi is supplied through line 93 to the chamber 94 below the diaphragm. The chambers 91 and 94 are defined by, and the diaphragm 92 is mounted in, a suitable housing 96. This housing also mounts a second diaphragm 97, coaxial with diaphragm 92, which separates a chamber 98 connected through line 63 to main fuel line 29 and a chamber 99 connected through line 64 to the throat of main fuel Venturi 62. Diaphragms 92 and 97 are both rigidly coupled to a valve spool 101 of a servo valve 100 mounted in the body 96. As will be apparent, spool 101 is biased upwardly by the pressure difference between chambers 98 and 99, which is proportional to the square of main fuel flow. Valve spool 101 is biased downwardly by the pressure difference between chambers 91 and 94, which is proportional to the square of afterburner fuel flow. The proportionality factor of the pressure difference between chambers 91 and 94 to afterburner fuel flow is varied by movement of the needle 88.

Valve 100 controls the throttling valve plunger 82, acting as a pilot valve therefor. Valve spool 101 has two lands which, in the neutral position illustrated, respectively close a port to which fuel is supplied from the afterburner pump through line 34 and branch line 34' and a port connecting to a drain line 102 leading to the pump inlet line 26. A servo fuel line 103 entering the valve body between lines 34' and 102 connects through a shutdown valve 105 and line 106 to the chamber 87 behind metering valve plunger 82. In operation of the afterburner, the shutdown valve 105 remains in the position shown. When the differential pressures on the two diaphragms 92 and 97 are equal because the ratio of afterburner fuel flow to main fuel flow is that selected by the position of needle 88, valve spool 101 will be in its neutral position. If afterburner flow increases above the desired value, the unbalanced pressure on the diaphragms will move valve spool 101 downward, supplying fuel from line 34' to chamber 87 to move the valve 82 in a closing direction. If afterburner fuel flow is below that called for, the unbalanced pressures move spool 101 upwardly, bleeding fluid from chamber 87 through outlet 102 so that fuel pressure acting on the outer face of plunger 82 opens the throttling valve.

As previously stated, the afterburner to main fuel flow ratio is controlled primarily by the pilot's lever 41, engine inlet temperature, and engine speed. The mechanism by which these quantities control the position of needle 88 and therefore the ratio of afterburner fuel to main fuel will now be described. Referring principally to FIGURE 3, control lever 41 operates shaft 42 on which is mounted a fuel ratio cam 108, which coacts with a follower 109 reciprocable in the body 110 of the control device. Body 110 is rigid with body 96. The follower 109, acting through a servomotor 111 to be described, reciprocates a slider 112 guided in the body 110. An arm 113 rigid with slider 112 mounts a pin 114 which slides in a slot 116 in a floating lever 117. Lever 117 is part of a multiplying linkage which combines the movement of slider 112 in response to the pilot's input and the action of a control device responsive to engine inlet temperature and speed.

As shown in the upper part of FIGURE 3, line 48 which conducts the pressure indicative of engine inlet temperature in connected to a bellows 118 fixed to the interior of body 110. Bellows 118 controls the axial displacement of a three-dimensional cam 120 through a force balance type servo to be described. Cam 120 has a cylindrical internal bore 121 which fits over a cylindrical boss 122 projecting from the case, thereby mounting the cam for rotation and axial movement. Cam 120 is rotated by the shaft 56 coupled to speed servo 50. This shaft is journaled in the case by means including a thrust collar 123 which holds the shaft fixed against axial movement. Splines 124 couple shaft 56 to cam 120 so that the cam is rotated by the shaft but may shift axially. A cam follower 126 reciprocably mounted in the body is biased against the contoured outer surface of cam 120 by a spring 127. Follower 126 is coupled by a pin 128 to one end of floating lever 117. The other end of lever 117 is coupled to a servomechanism 130, to be described, which causes rod 131 to reciprocate so as to follow the movements of the end of link 117. Rod 131 enters the afterburner fuel conduit 132 leading from flowmeter 90 through an elbow therein, and is fixed to needle 88.

Changes in inlet temperature, reciprocating cam 120, and changes in engine speed, rotating the cam, reciprocate follower 126 and thereby needle 88. The pilot's input 41, by shifting the pivot pin 114, changes the ratio of transmission between follower 126 and rod 131, and, therefore, link 117 acts to multiply the movements of follower 126 and slider 112. Cam 120 is contoured to set a schedule of fuel flow with respect to inlet temperature and engine speed suitable to the particular engine to which the controls apply. This cam determines a basic relation between these two controlling parameters and the ratio of afterburner to main fuel flow which ratio may be proportionally increased or decreased by movement of lever 41 shifting pivot 114.

Servomechanisms

We may now proceed to a description of the servomechanisms previously mentioned, beginning with the means for supplying operating fluid to them. As previously pointed out, servo fluid for the servos other than that for the main throttling valve 82 is supplied from the main fuel pump 27 through line 43. This line delivers fuel to a number of interconnected servo fuel supply lines or passages 135 through a servo fuel pressure control valve 136, which is a pressure regulating valve of known type. Valve 136 comprises a spool 137 mounted in a bore 138 of the housing 110 and biased downwardly as illustrated by compression spring 139. Servo fuel line 43 enters bore 138 through a port which is closed by land 141 of the valve spool on upward movement thereof against the spring force. Servo supply line 135 branches from bore 138 between the lands of spool 137 and communicates with a chamber 142 below the spool. The chamber above the spool communicates through a port 143 with the interior cavity, generally indicated as 144, of the housing which is filled with fuel at servo exhaust or reference pressure. Valve spool 137 moves to maintain a predetermined difference between the pressure in line 135 and that in cavity 144, determined by the tension of spring 139. The opening of the valve is dependent upon the demand for servo fuel and leakage from the servos.

The reference pressure in cavity 144 is maintained at a constant value slightly above the maximum value of fuel supply pressure in line 26. This result is obtained by a reference pressure regulating valve 146 which controls discharge of fuel from within the housing to the drain line 44 which connects to the fuel supply line 26. Valve 146 comprises a cup 147 fixed to the interior of casing 110 which has mounted within it a resilient evacuated bellows 148 to the head of which is fixed a valve plunger 149. Fuel may flow from chamber 144 through ports 151 in the cup 147 and, when the pressure reaches a value sufficient to compress bellows 48 against its elastic resistance, the bellows contracts sufficiently to allow servo fluid to exhaust into line 44. It will be seen, therefore, that means are provided to ensure predetermined substantially constant inlet and exhaust or reference pressures for the fuel operated servos. This is desirable to insure consistent operation of the servos and to provide a constant external pressure against pressure-responsive bellows such as 118 and 185.

Considering first the operation of the servo 111 which is controlled by the pilot's input lever 41 to move the slider 112; slider 112 is integral with a piston 153 reciprocable in a cylinder 154. Servo fuel is supplied from line 135 through an orifice 156 to the right hand end of cylinder 154. The left hand end of the cylinder drains to reference pressure through a passage 157. A drilled passage 158 in slider 112, which is plugged at its outer end, communicates through a lateral port 159 with the space to the right of the piston and through a lateral port 161 with reference pressure. The port 161 is controlled by a sleeve 162, reciprocable on slider 112, which is coupled to the cam follower 109. A compression spring 163 monted between sleeve 162 and a flange 164 on the slider biases the slider to the right and biases the follower 109 into contact with cam 108. The pressure to the right of piston 153 is dependent upon the relative areas of orifice 156 and port 161, as throttled by sleeve 162. When the parts are in a static condition, port 161 is partly closed. If sleeve 162 moves to the left, port 161 will be further closed, and servo fuel will move piston 163 and slider 112 to the left until the discharge through port 161 equals the flow through orifice 156. If follower 109 moves to the right, further opening port 161, the leakage from the cylinder will exceed the inflow and the slider will move to the right until the port 161 is partly closed as before.

The servo 130 which moves the Venturi needle 88 is essentially the same as that just described and, therefore, the structure will be described only briefly. This servo comprises a piston 166 reciprocable in a cylinder 167 to which servo fuel is supplied from passage 135 through an orifice 168. Discharge of fuel from the cylinder through a passage 169 in rod 131 is controlled by sleeve 171 coacting with a radial port 172. Sleeve 171 is coupled by a roller 173 to the end of floating lever 117.

The servo which shifts three-dimensional cam 120 in its axial direction operates upon the same general principle, but is a force balance type of servo. The chamber 175 defined by the internal cavity 121 of the cam is supplied with servo fuel from passage 135 through a restriction 176. A passage 177 in the shaft 56 provides an outlet from chamber 175 which is varied by relative movement of the head 178 of temperature bellows 118 with respect to the axially fixed shaft 56. A compression spring 179 and a ball thrust bearing 181 are mounted between head 178 and a shoulder 182 on the cam. Spring 179 provides a force tending to contract bellows 118 and a force biasing cam 120 to the right. The thrust bearing 181 permits free rotation of the cam. If we assume the temperature servo is balanced in a static condition, the force of spring 179 is such with respect to the pressure force within the bellows that it maintains a space between the end of shaft 56 and head 178 such that the pressure in chamber 175 balances the thrust of spring 179. If engine inlet temperature increases, bellows 118 will expand and the flow from chamber 175 will be further throttled. The pressure therein will increase, and the cam 120 will move to the left, compressing spring 179 to restore head 178 substantially to its original position. The movement of cam 120 to load spring 179 so that its thrust balances the pressure in bellows 117 provides the temperature input to cam 120. Upon a decrease of inlet temperature, the reverse action to that just described occurs. It will be apparent that some leakage may occur past splines 124 and through the fit between boss 122 and the cam. Since this leakage is substantially constant, it may be compensated for by proper sizing of the orifices controlling the servo.

Fuel overrides

Considering now the overrides or limits on afterburner fuel flow, the inlet temperature responsive override means is supplied by a branch of the pressure line 43 from the sensor 47, which connects to a bellows 185 mounted in the case 110. The head of bellows 185 biases the rod 186 in opposition to a compression spring 187, the loading of which may be adjusted by a screw 188. A bleed valve arm 189 pivoted at 191 in the case is coupled by a pin 192 to the rod 186 so as to be swung about the pivot 191. Arm 189 is biased to the right by spring 187, and to the left by bellows 185 and by a compression spring 193 mounted between the flange 164 of slider 112 and arm 189.

The force exerted by bellows 185 depends upon engine inlet temperature, that exerted by spring 187 is substantially constant, and that exerted by spring 193 depends upon the position of slider 112 in response to the pilot's input 41. As the slider 112 moves to the right to decrease fuel, the force of spring 193 is decreased. Arm 189 mounts a valve member 194 which controls a port 196 connected through branch 66' of line 66 to the cylinder 154. Normally, valve 194 closes port 196. However, if inlet temperature is too high with respect to the afterburner fuel setting, bellows 196 forces valve 194 to the left to bleed servo fuel from cylinder 154 and reduce the afterburner fuel setting. It will be noted that the higher the afterburner fuel setting from lever 41 is, the lower the inlet temperature is that is required to reduce the fuel setting, because of the loading of spring 193 by slider 112. The reason for this is that increasing inlet temperature reduces the corrected speed of the compressor and brings it nearer to the surge line. Increasing afterburner fuel-air ratio, by increasing the compressor discharge pressure, also tends toward compressor surge. Thus, afterburner fuel is restricted to a lower limit at higher engine inlet temperatures. Reducing afterburner fuel decreases forward speed and lowers the inlet temperature because of reduced ram temperature rise.

Limiting of fuel flow to the afterburner in response to turbine pressure ratio is similarly effected by bleeding servo fuel from cylinder 154 through line 66 under control of the turbine pressure ratio control device 67. This may be effected by a valve similar to valve 194 in the turbine pressure ratio control which is opened by the control 67 whenever turbine pressure ratio reaches a predetermined minimum value. In this way, the afterburner fuel is decreased to prevent reduction of turbine pressure ratio below the desired value. The turbine pressure ratio control may be biased by an engine inlet temperature sense for more accurate control.

Shutdown valve

The shutdown valve 105 (FIGURE 2) is shown in its position for operation of the afterburner. This valve provides means for initiating and stopping flow of fuel to the afterburner, the controls for which, including a shutdown pilot valve 200, will now be described. The pilot operated control shaft 42 mounts a cam 201 which engages the stem of a valve spool 202 (FIGURE 3) mounted in a bore 203 in the case and biased toward the cam by a compression spring 204. In the position of pilot valve 200 to permit flow of fuel to the afterburner, as illustrated in FIGURES 2 and 3, servo fuel may flow from passage 135 between the lands of the valve spool into a pressure line 206 which communicates with a chamber 207 beneath the spool 208 of the shutdown valve 105. The servo fuel pressure in chamber 207 biases the spool upwardly against a compression spring 209 to the position shown in which lines 103 and 106 are connected. When the control lever 41 is moved to the position to shut off afterburner fuel, cam 201 pushes spool 202 to the right, cutting off line 206 from servo fuel line 135 and connecting it instead to a passage 211 leading to reference fuel pressure in the cavity 144 of the casing. The consequent reduction of pressure in chamber 207 allows spring 209 to move valve spool 208 downwardly, shutting off line 106 from line 103 and connecting line 106 to the afterburner fuel pump discharge line through branch line 34'. This supplies fuel pump pressure to chamber 87, so that this pressure equals the pressure tending to bias the plunger 82 to the right. Spring 83 therefore closes the fuel metering valve, shutting off all flow of fuel. The chamber above valve spool 208 is vented to reference pressure through a connection 212, and the chamber to the right of valve spool 202 is similarly vented through a connection 213.

Manifold selection

The afterburner fuel control includes a valve mechanism to distribute the fuel to the three manifolds 21 to 23 of the afterburner to provide for zone burning. Zone burning means that the fuel is concentrated over only a portion of the exhaust duct when the fuel to air ratio is small, so that a sufficiently rich mixture for burning is provided in the area to which fuel is supplied. At low fuel to air ratios, only one manifold is supplied; at higher ratios, two are supplied; and at still higher ratios, the fuel is supplied to all three manifolds.

This manifold selection is effected by movement of the pilot's lever 41 which basically determines the degree of afterburner thrust augmentation, or, in other words, the afterburner fuel to air ratio. The three-dimensional cam 120 indicates the quantity of air available for combustion as a ratio to main fuel flow and modulates afterburner fuel flow accordingly. Therefore, the fuel to air ratio of the afterburner is closely proportional to the position of slider 112, which moves to the left as illustrated in FIGURE 2 to increase fuel flow.

Manifold selection is accomplished by a hollow rotary valve sleeve 220, mounted in a bore in the case, to which is fixed a gear 221. Gear 221 engages a rack 222 on the right end of slider 112 so that the valve sleeve is rotated by movement of the slider. The open upper end of the valve sleeve receives fuel from the passage 132, which also communicates through a restriction 223, conduit 224, and check valve 225 with fuel line 37. Valve sleeve 220 defines two ports 226 and 227 which cooperate respectively with tapered ports 228 and 229 in the body. As slider 112 is moved to the left to increase fuel, port 226 opens to port 228 to supply fuel through connection 231 and check valve 232 to line 38. Still further movement of the slider 112 opens port 227 to port 229 which connects through line 233 and check valve 234 to afterburner supply line 39. The check valves prevent return flow into the control. The restriction 223 tends to cause a build-up of pressure ahead of the restriction to aid fuel flow through ports 226 and 227 as they open. Ports 228 and 229 are tapered so that, when an additional afterburner fuel manifold is cut in, the flow to it increases gradually so that there is no danger of starving the manifold or manifolds already in operation, which might cause extinction of the flame.

The range of movement of slider 112 is limited by adjustable stop screws 241 and 242 in the case.

Operation

The operation of the control has been described, but it may be helpful to review it briefly. The afterburner is controlled by the pilot's lever 41 which also is connected to the main fuel control, and which may be operated to a position calling for afterburning when the gas turbine is in such a condition of operation that afterburning is feasible (ordinarily, substantially full power operation). The initial operation of lever 41 into the afterburning range operates the shutdown pilot valve 202 to move shutdown valve 105 upwardly by supplying servo fuel pressure to the chamber 207 below the valve. This cuts off afterburner fuel pump pressure, which otherwise holds the afterburner fuel metering valve 80 closed, and puts the metering valve under control of the afterburner to main fuel ratio controlled pilot valve 101. Valve 77 controlling air flow to the afterburner pump is opened by suitable means responsive to the signal for afterburning; also, the afterburner igniter (not illustrated) is operated.

This initial movement of the pilot's lever 41 leaves slider 112 in its farthest right position calling for the minimum afterburner fuel. This minimum value of fuel is determined by the three-dimensional cam 120 which receives an input of engine speed and an input representing engine temperature. These quantities, together with the amount of fuel supplied to the engine, determine the amount of fuel supplied to the afterburner. Under these conditions, the needle 88 is moved upwardly to provide approximately the maximum restriction of the throat of Venturi 87, so that a relatively small afterburner flow with relation to main fuel flow will balance the diaphragms 92 and 97 to operate metering valve 80 to supply the minimum afterburner fuel. The exact position of needle 88 will depend, of course, upon engine speed and inlet temperature. As lever 41 is moved farther to call for increased afterburning, cam 108 moves slider 112 progressively to the left, so that for a given engine speed and inlet temperature, the increased ratio of lever 117 causes needle 88 to be further retracted, thereby increasing the afterburner fuel flow. As the slider 112 moves to the left beyond an initial range, fuel is supplied to manifold 22 in addition to manifold 21, which is supplied with fuel at all times when the afterburner is operating. As the demand for augmentation increases to the top part of the range, fuel also is supplied through line 39 to manifold 23.

Particularly at the higher levels of augmentation, fuel may be limited to assure satisfactory running of the engine by the control 67 responsive to turbine pressure ratio which resets slider 112 to the right to decrease fuel flow if turbine pressure ratio decreases to the minimum satisfactory level.

Also, when engine inlet temperature becomes too high in relation to the level of afterburning called for by the cam 108, the temperature sensitive bellows 185 operates valve 194 to reduce the afterburner fuel flow.

It may be noted that there is no need to correct afterburner fuel flow in response to engine inlet pressure, because both air flow and main fuel flow are proportional to this quantity. Increase of engine inlet temperature decreases mass air flow, but requires an even greater decrease in main fuel flow to hold turbine inlet temperature constant. Therefore, the inlet temperature input to cam 120 cancels out the latter factor, so that afterburner fuel flow is modified only by the effect of inlet air temperature on engine mass air flow.

An increase in engine rotor speed, with other conditions fixed, requires more fuel and also increases air flow. However, this change varies the ratio of main fuel to air flow. The speed input to cam 120 corrects for this variance.

As a result, the output of cam 120 closely represents the ratio of the air flow available for combustion in the afterburner to the rate of supply of main fuel, and corrects automatically for changes in this ratio by controlling the basic value of afterburner fuel so it is proportioned to air available.

The movement of slider 112 by the pilot introduces a multiplying factor which varies the ratio of fuel to air in the afterburner as desired, and operates the manifold selector valve accordingly.

It will be apparent to those skilled in the art that my afterburner control is particularly adapted to provide accurate and flexible control of afterburner fuel to obtain maximum efficiency and reliability of afterburner operation, with an apparatus of relative simplicity compared to presently preferred afterburner controls. It also provides very simple and satisfactory means to override the fuel ratio selection and limit fuel to protect the engine.

The direct connection between the fuel-air ratio selecting control and the manifold selector valve, and incorporation of these into a common assembly, is highly advantageous in correlating fuel rate and fuel distribution in the afterburner, providing a compact and reliable mechanism.

The control of the supply and exhaust pressures of the servomechanism produces more consistent and accurate operation. Control of the exhaust pressure serving as the environmental pressure of the pressure-responsive bellows eliminates the need for evacuated environmental pressure compensating bellows.

The invention is not to be regarded as limited in any way by the detailed description herein of the preferred embodiment thereof for the purpose of explaining the invention. It will be apparent that many modifications can be made by the exercise of skill in the art within the scope of the principles of the invention.

I claim:

1. An afterburner fuel control for a turbojet engine having main combustion apparatus, means for supplying fuel thereto, a turbine, an afterburner, and means for supplying fuel to the afterburner, the afterburner fuel control comprising, in combination, means for controlling afterburner fuel flow to maintain said flow in a determined ratio to main fuel flow; means connected to the controlling means adapted to determine the said ratio including three-dimensional cam means moved in one sense in response to turbine speed and in another sense in response to engine inlet air temperature, the cam means having a follower and being so contoured that the movement of the follower represents the relation between engine air flow and main fuel flow, and manually controllable variable ratio setting means connecting the cam follower to the afterburner fuel flow controlling means; means responsive to engine inlet air temperature coupled to the ratio setting means adapted to decrease the ratio setting in response to inlet temperature above a predetermined level, and means responsive to the ratio setting means for reducing the predetermined level as the ratio setting increases.

2. An afterburner fuel control for a jet engine having main combustion apparatus, means for supplying fuel thereto, a turbine, an afterburner, and afterburner fuel supply means, the afterburner fuel control comprising, in combination, metering means controlling flow from the supply means to the afterburner, means controlling the metering means responsive to the ratio of afterburner fuel flow to main fuel flow including a flow measuring device connected between the supply means and the afterburner means, means movable to vary the response of the flow measuring device to vary the ratio of afterburner fuel to main fuel, a manually settable control, means responsive to engine inlet air temperature, means responsive to turbine speed; and ratio control means actuated by the settable control, the temperature responsive means, and the speed responsive means coupled to and setting the movable means.

3. An afterburner fuel control for a jet engine having main combustion apparatus, means for supplying fuel thereto, a turbine, an afterburner, and afterburner fuel supply means, the afterburner fuel control comprising, in combination, metering means controlling flow from the supply means to the afterburner, means controlling the metering means responsive to the ratio of afterburner fuel flow to main fuel flow including a flow measuring device connected between the supply means and the afterburner, means movable to vary the response of the flow measuring device to vary the ratio of afterburner fuel to main fuel, a manually settable control, means responsive to engine inlet air temperature, means responsive to turbine speed; ratio control means actuated by the settable control, the temperature responsive means, and the speed responsive means coupled to and setting the movable means, first fuel limiting means responsive to engine inlet air temperature coupled to the ratio control means, and second fuel limiting means responsive to turbine pressure ratio coupled to the ratio control means.

4. An afterburner fuel control for a jet engine having main combustion apparatus, means for supplying fuel thereto, a turbine, an afterburner having plural fuel manifolds, and afterburner fuel supply means, the afterburner fuel control comprising, in combination, metering means controlling flow from the supply means to the afterburner, means controlling the metering means responsive to the ratio of afterburner fuel flow to main fuel flow including a flow measuring device connected between the supply means and the afterburner, means movable to vary the response of the flow measuring device to vary the ratio of afterburner fuel to main fuel, a manually settable control, means responsive to engine inlet air temperature, means responsive to turbine speed; ratio control means actuated by the settable control, the temperature responsive means, and the speed responsive means coupled to and setting the movable means, fuel limiting means responsive to engine inlet air temperature coupled to the ratio control means, a manifold selector valve connected between the flow measuring device and the afterburner adapted to direct fuel selectively to the afterburner fuel manifolds, and means coupling the selector valve to the settable control for actuation thereby.

5. An afterburner fuel control for a jet engine having main combustion apparatus, means for supplying fuel thereto, a turbine, an afterburner having plural fuel manifolds, and afterburner fuel supply means, the afterburner fuel control comprising, in combination, metering means controlling flow from the supply means to the afterburner, means controlling the metering means responsive to the ratio of afterburner fuel flow to main fuel flow including a flow measuring device connected between the supply means and the afterburner, means movable to vary the response of the flow measuring device to vary the ratio of afterburner fuel to main fuel, a manually settable control, means responsive to engine inlet air temperature, means responsive to turbine speed; ratio control means actuated by the settable control, the temperature responsive means, and the speed responsive means coupled to and setting the movable means, fuel limiting means responsive to turbine pressure ratio coupled to the ratio control means, a manifold selector valve connected between the flow measuring device and the afterburner adapted to direct fuel selectively to the afterburner fuel manifolds, and means coupling the selector valve to the settable control for actuation thereby.

6. An afterburner fuel control for a jet engine having main combustion apparatus, means for supplying fuel thereto, a turbine, an afterburner having plural fuel manifolds, and afterburner fuel supply means, the afterburner fuel control comprising, in combination, metering means controlling flow from the supply means to the afterburner, means controlling the metering means responsive to the ratio of afterburner fuel flow to main fuel flow including a flow measuring device connected between the supply means and the afterburner, means movable to vary the response of the flow measuring device to vary the ratio of afterburner fuel to main fuel, a manually settable control, means responsive to engine inlet air temperature, means responsive to turbine speed; ratio control means actuated by the settable control, the temperature responsive means, and the speed responsive means coupled to and setting the movable means, first fuel limiting means responsive to engine inlet air temperature coupled to the ratio control means, second fuel limiting means responsive to turbine pressure ratio coupled to the ratio control means, a manifold selector valve connected between the flow measuring device and the afterburner adapted to direct fuel selectively to the afterburner fuel manifolds, and means coupling the selector valve to the settable control for actuation thereby.

7. An afterburner fuel control for a turbojet engine having main combustion apparatus, means for supplying fuel thereto of a type determining the ratio of main fuel flow to engine air flow as a first function of engine inlet air temperature and turbine speed, a turbine, an afterburner, and means for supplying fuel to the afterburner; the afterburner fuel control comprising, in combination, means for controlling afterburner fuel flow to maintain said flow in a calculated ratio to main fuel flow; function generating means effective to calculate a second function which is the inverse of the first function including an input member operated in response to turbine speed, an input member operated in response to engine inlet air temperature, and an output member connected to said input members producing the second function, which is the inverse of the first function and therefore is the ratio of air flow to main fuel flow; and manually controllable variable ratio setting means providing a multiple of the second function representing the said calculated ratio and connecting the output member to the afterburner fuel flow controlling means.

8. An afterburner fuel control as recited in claim 7 including a three-dimensional cam operated in two dimensions by the said input members and contoured to operate a follower in the third dimension according to the said second function; and a follower coupling the cam to the said output member.

References Cited in the file of this patent
UNITED STATES PATENTS

| | | |
|---|---|---|
| 2,498,939 | Bobier | Feb. 28, 1950 |
| 2,566,373 | Redding | Sept. 4, 1951 |
| 2,668,414 | Lee | Feb. 9, 1954 |
| 2,761,278 | Jones | Sept. 4, 1956 |
| 2,906,093 | Robinson | Sept. 29, 1959 |
| 3,019,602 | Plummer | Feb. 6, 1962 |

FOREIGN PATENTS

| | | |
|---|---|---|
| 1,105,255 | France | June 29, 1955 |